US012466698B2

(12) United States Patent
Fauconnet et al.

(10) Patent No.: US 12,466,698 B2
(45) Date of Patent: Nov. 11, 2025

(54) ELEVATOR CAR WITH STOWABLE WORKING PLATFORM

(71) Applicant: OTIS ELEVATOR COMPANY, Farmington, CT (US)

(72) Inventors: Aurélien Fauconnet, Isdes (FR); Frédéric Beauchaud, Coullons (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/747,534

(22) Filed: Jun. 19, 2024

(65) Prior Publication Data

US 2025/0051135 A1 Feb. 13, 2025

(30) Foreign Application Priority Data

Aug. 10, 2023 (EP) ..................................... 23306359

(51) Int. Cl.
*B66B 11/02* (2006.01)

(52) U.S. Cl.
CPC ................................ *B66B 11/0246* (2013.01)

(58) Field of Classification Search
CPC .......................... B66B 11/0246; B66B 5/0087
See application file for complete search history.

(56) References Cited

U.S. PATENT DOCUMENTS

| | | | | | |
|---|---|---|---|---|---|
| 6,202,800 | B1 * | 3/2001 | Muller | B66B 11/0246 | 187/401 |
| 6,202,801 | B1 * | 3/2001 | Muller | B66B 11/0246 | 187/401 |
| 6,273,216 | B1 * | 8/2001 | Kocher | B66B 5/027 | 187/377 |
| 6,419,052 | B1 * | 7/2002 | Muller | B66B 11/0246 | 187/414 |
| 6,691,833 | B1 * | 2/2004 | Elsener | B66B 11/0246 | 187/254 |
| 6,880,678 | B1 * | 4/2005 | Schneider | B66B 11/0246 | 187/314 |
| 7,337,880 | B2 * | 3/2008 | Sittler | B66B 11/0246 | 187/401 |
| 9,193,566 | B1 * | 11/2015 | Nieves | B66B 11/0226 | |
| 9,546,078 | B2 * | 1/2017 | Paasisalo | B66B 11/0226 | |
| 11,091,352 | B2 * | 8/2021 | Fauconnet | B66B 11/0246 | |
| 11,104,550 | B2 * | 8/2021 | Fernandez | B66B 11/0246 | |
| 11,524,874 | B2 * | 12/2022 | Montigny | B66B 11/0246 | |
| 11,639,285 | B2 * | 5/2023 | Siironen | B66B 11/0246 | 187/401 |

(Continued)

FOREIGN PATENT DOCUMENTS

| | | |
|---|---|---|
| EP | 1566357 A1 | 8/2005 |
| EP | 3828119 A1 | 6/2021 |

*Primary Examiner* — Michael A Riegelman
(74) *Attorney, Agent, or Firm* — Carlson, Gaskey & Olds, P.C.

(57) ABSTRACT

An elevator car defines an interior space for accommodating passengers and/or cargo. The elevator car comprises a working platform and a tension member, wherein the working platform is moveable between a stowed position, above the interior space, and an operational position, within the interior space using the tension member. and A support member is arranged to support the working platform, from below, when the working platform is in the operational position.

18 Claims, 14 Drawing Sheets

(56) References Cited

U.S. PATENT DOCUMENTS

| | | | | |
|---|---|---|---|---|
| 11,655,121 | B2 * | 5/2023 | Fever | B66B 11/0246 187/401 |
| 11,858,777 | B2 * | 1/2024 | Fauconnet | B66B 11/0246 |
| 11,945,684 | B2 * | 4/2024 | Fauconnet | B66B 5/027 |
| 2006/0289244 | A1 * | 12/2006 | Sittler | B66B 11/0246 187/401 |
| 2007/0056809 | A1 * | 3/2007 | Fernandes | B66B 11/0246 187/401 |
| 2007/0056810 | A1 * | 3/2007 | Fernandes | B66B 5/00 187/401 |
| 2019/0226217 | A1 * | 7/2019 | Foley | E04G 1/34 |
| 2019/0263629 | A1 * | 8/2019 | Fernandez | B66B 11/0246 |
| 2019/0300338 | A1 * | 10/2019 | Rocher | B66B 13/02 |
| 2019/0330023 | A1 * | 10/2019 | Fauconnet | B66B 11/0206 |
| 2019/0330024 | A1 * | 10/2019 | Durand | B66B 11/0025 |
| 2019/0389698 | A1 * | 12/2019 | Jimenez-Gonzalez | B66B 11/0246 |
| 2020/0277163 | A1 * | 9/2020 | Fauconnet | B66B 5/0012 |
| 2020/0277164 | A1 * | 9/2020 | Fauconnet | B66B 19/00 |
| 2021/0002104 | A1 * | 1/2021 | Fauconnet | B66B 5/0087 |
| 2021/0061616 | A1 * | 3/2021 | Fauconnet | B66B 9/00 |
| 2021/0155458 | A1 * | 5/2021 | Montigny | B66B 11/0246 |
| 2021/0269279 | A1 * | 9/2021 | Talonen | B66B 1/30 |
| 2021/0269283 | A1 * | 9/2021 | Siironen | B66B 11/0246 |
| 2022/0024724 | A1 * | 1/2022 | Fauconnet | B66B 9/00 |
| 2023/0391586 | A1 * | 12/2023 | Boniface | B66B 5/0087 |
| 2023/0391587 | A1 * | 12/2023 | Fauconnet | B66B 11/0246 |
| 2024/0002193 | A1 * | 1/2024 | Fauconnet | B66B 11/0246 |

* cited by examiner

ELEVATOR CAR WITH STOWABLE WORKING PLATFORM

CROSS-REFERENCE TO RELATED APPLICATION

This application is a U.S. non-provisional application claiming the benefit of European Application No. 23306359.3, filed on Aug. 10, 2023, which is incorporated herein by reference in its entirety.

TECHNICAL FIELD

This disclosure relates to an elevator car with a working platform used to carry out maintenance from inside an elevator car.

BACKGROUND

It is known to provide working platforms located in or above the ceiling of elevator cars, which are moveable between a stowed position and a deployed position. In the deployed position, the working platform is located within the elevator car, at such a height that a maintenance person is able to stand on the working platform and access elevator components through an opening in the elevator car ceiling. Typically, such a working platform is suspended from at least one pair of suspension arms which support the working platform as it is being lowered and also when the working platform is in the deployed position and being used by the maintenance person.

SUMMARY

The present disclosure seeks to provide an improved working platform. According to a first aspect of this disclosure there is provided an elevator car defining an interior space for accommodating passengers and/or cargo, the elevator car comprising: a working platform; a tension member, wherein the working platform is moveable between a stowed position, above the interior space, and an operational position, within the interior space, using the tension member; and a support member, arranged, when in a supporting position, to support the working platform, from below, when the working platform is in the operational position.

By providing a tension member for moving the working platform, together with a support member for supporting the working platform from below in the operational position, a working platform is provided that is convenient and easy to deploy and use. The provision of a tension member enables easy and safe raising and lowering of the working platform, whilst the provision of a support member ensures that the tension member does not need to suspend the working platform during use in the operational position. As a result, the tension member does not need to be able to withstand the additional weight of a maintenance person and their tools, which will be on the working platform when in use in the operational position. This allows smaller, lower cost tension members to be used, and likewise allows other components of the hoisting system (e.g. sheaves) to be kept small and low cost. It will therefore be appreciated that the tension member fulfils a hoisting and lowering function for the working platform, but does not need to provide a suspension function of the working platform in the operational position during use, since the support member is provided.

The working platform is movable between the stowed position and the operational position using the tension member. Thus, the working platform is able to be raised and lowered using the tension member. In some examples, the tension member is actuatable (i.e. actively actuatable) so as to hoist the working platform from the operational position to the stowed position. The tension member may also be actuatable (i.e. actively actuatable) to lower the working platform from the operational position to the stowed position. For example, the tension member may be actuatable by a winch or winding mechanism to be let in and out. Alternatively, movement of the working platform downwards may not require active actuation of the tension member, but rather may happen provided that movement of the tension member is enabled. For example, the working platform may be arranged to move under the force of gravity downwards, so that all that is required is either full release of the tension member, or controlled release, to lower the working platform down. Thus, in some examples, the working platform is movable (lowerable) from the stowed position to the operational position by enabling movement of the tension member.

In some examples, the tension member comprises a suspending portion extending between the working platform and an upper part of the elevator car, wherein the length of the suspending portion is adjustable using the tension member (e.g. by moving or actuating the tension member). The tension member may comprise more than one (e.g. two or more) suspending portions.

Adjusting the length of the suspending portion(s) may move the working platform between the operational position and the stowed position. The working platform may be lowered to the operational position by (controlled or uncontrolled) lengthening of the suspending portion(s) of the tension member. The working platform may be hoisted (i.e. raised) to the stowed position by shortening the suspending portion(s). It will be appreciated that although referred to as a "suspending" portion of the tension member, that portion need not always act to suspend the working platform. In particular, the suspending portion (or portions) may not suspend the working platform where the working platform is in the operational position and the support member(s) are supporting the working platform from below (i.e. in the supporting position). Nonetheless the portions may be understood as suspending portions since they suspend the working platform as it is moved between the stowed and operational position, and optionally when the working platform is in the stowed position.

In some examples, the elevator car further comprises a stopper mechanism, having an open configuration, in which the stopper mechanism allows movement (i.e. movement through or past the stopper mechanism) of the tension member such as to allow movement of the working platform between the stowed position and the operational position, and a closed configuration, in which the stopper mechanism prevents movement (i.e. movement through or past the stopper mechanism) of the tension member such as to prevent movement of the working platform between the stowed position and the operational position. Thus, in the open configuration, the stopper mechanism allows the length of the suspending portion(s) to be adjusted (i.e. varied), and in the closed configuration, the stopper mechanism prevents the length of the suspending portion(s) from being adjusted (i.e. it causes the suspending portion to have a fixed length). The stopper mechanism may be in contact with the tension member (i.e. direct contact). The tension member may pass through the stopper mechanism.

In some examples, the stopper mechanism is biased into the closed configuration. Thus, by default, movement of the tension member will be prevented (and therefore movement of the working platform between the stowed position and the operational position). Actuation of the stopper mechanism into the open configuration is needed to allow movement of the tension member and therefore of the working platform.

In some examples, the stopper mechanism is biased into the closed configuration by the weight of the working platform applying a reaction force to the stopper mechanism. This may improve safety by helping to prevent unwanted movement of the tension member(s) and therefore preventing unwanted movement of the working platform. In some examples, the stopper mechanism is movable to the open configuration using the tension member(s) (i.e. by moving the tension member in a manner which isn't prevented by the stopper mechanism being in the closed configuration). This allows easy release of the stopper mechanism without needing a separate actuator for the stopper mechanism.

In some examples, the stopper mechanism is located at an upper part of the elevator car. For example, the elevator car may comprise a support frame positioned above the interior space, and the stopper mechanism may be located at (e.g. mounted to) the support frame.

In some examples, the stopper mechanism comprises an activation portion. The stopper mechanism may comprise an engagement portion, which may comprise at least one protrusion. The stopper mechanism (e.g. the engagement portion) may comprise two protrusions, arranged to engage, respectively, with the first tension member and the second tension member (discussed below). Having one stopper mechanism for two (e.g. both) tension members is advantageous since it reduces the number of components that are required, and helps the tension members to be moved together, since either both are free to move or neither are, which helps the movement of the working platform to be even (i.e. not resulting in a sloped working platform). The engagement portion may be pivotably mounted to the activation portion.

In some examples, the elevator car further comprises one or more deflection sheaves, wherein the tension member is arranged to pass over the one or more deflection sheaves between the working platform and the upper part of the elevator car. The tension member may be arranged to pass over the one or more deflection sheaves between the working platform and the stopper mechanism. Where two tension members are present, as discussed below, each may pass over a separate subset of deflection sheaves.

The stopper mechanism may be connected to at least one deflection sheave of the one or more deflection sheaves (optionally to two deflection sheaves of the one or more deflection sheaves). The stopper mechanism may be connected to a first deflection sheave, wherein the first tension member is associated with (e.g. passes over) the first deflection sheave and a second deflection sheave, wherein the second tension member is associated with (e.g. passes over) the second deflection sheave. The activation portion may be (pivotably) mounted to one or more deflection sheaves. The at least one protrusion may be arranged to extend into a groove of the deflection sheave (i.e. a groove arranged to accommodate a tension member) when the stopper mechanism is in the closed position.

In some examples, a deflection sheave of the one or more deflection sheaves is mounted to an edge of the working platform (i.e. an edge of the working platform extending between a top surface of the working platform and a lower surface of the working platform). This has the advantage that the deflection sheave does not occupy space on the top surface of the working platform, giving a maintenance person more working space, whilst also allowing relatively simple roping arrangements of the tension member(s).

In some examples, a deflection sheave of the one or more deflection sheaves may be pivotably mounted to the working platform, i.e. such that an orientation of the axis of rotation of the deflection sheave is variable. This helps the deflection sheave, and therefore the tension member, to stay aligned with the rest of the tension member roping.

In some examples, the tension member is a flexible rope, cable or belt.

The tension member may be fixed at one end to the working platform or to a component in the upper part of the elevator car (e.g. the support frame). Another (i.e. the other) end of the tension member may be free, i.e. not fixed to any component, such that it is moveable or actuatable by a user.

In some examples, the tension member referred to above is a first tension member, and the elevator car further comprises a second tension member. The working platform may be moveable between the stowed position and the operational position using both the first tension member and the second tension member.

The second tension member may comprise a second suspending portion extending between the working platform and the upper part of the elevator car. The second tension member may comprise more than one (e.g. two) suspending portions. It will be appreciated that the number of suspending portions in each tension member may be any suitable number and will depend on the roping arrangement used for each of the tension members. Thus, each tension member may comprise a respective one or more suspending portions extending between the working platform and the upper part of the elevator car, wherein the length of the respective suspending portions is adjustable (together) to move the working platform between the operational position and the stowed position.

The first tension member and the second tension member may be connected to opposite sides of the working platform. Each tension member may be connected to the working platform in at least two positions. The first tension member may be connected to the working platform at a first position and a second position, wherein both the first position and the second position are located along a first side of the working platform. The second tension member may be connected to the working platform at a third position and a fourth position, wherein both the third position and the fourth position are located along a second side of the working platform. The first side may be opposite to the second side (e.g. they may be sides that extend along parallel directions).

As set out above, both the first and second tension members may be connected to (e.g. pass through) the stopper mechanism. Thus, in some examples, in the open configuration the stopper mechanism allows movement of the second tension member (in addition to allowing movement of the (first) tension member), and in the closed configuration the stopper mechanism prevents movement of the second tension member (in addition to preventing movement of the (first) tension member). This increases convenience since both tension members may be actuated easily together, and motion for both tension members enabled or prevented together by the same stopper mechanism.

In some examples the one or more tension members may be all that connects the working platform to the upper part of the elevator car (i.e. since there is not a separate suspension mechanism).

The (at least one) support member may be attached (e.g. in hinged connection with) the working platform. Thus, the working platform may comprise the at least one support member.

The (at least one) support member is arranged (i.e. when in a supporting position) to support (i.e., to support the weight of) the working platform from below when the working platform is in the operational position. By this it will be understood that the support member is able to support the weight of the working platform when the working platform is in the operational position, i.e. at at least some times, but not that it always must support the weight of the working platform when the working platform is in the operational position (i.e. at the operational height). The support member, when in the supporting position, may extend away from the working platform, so as to support the working platform from below. The supporting member may be fixed in position, i.e. fixed in the supporting position. Alternatively, in some examples, the support member is movable between a stowed position, and the supporting position. In the stowed position, the support member may extend substantially parallel to the plane of the working platform (i.e. so that it does not extend significantly below the working platform).

The support member may be hinged to move between the stowed position and the supporting position, i.e. the support member may be foldable out from the stowed position to the supporting position.

The support member may be arranged to rest (e.g. in the supporting position) on a floor of the elevator car, i.e. provided that the working platform is in the operational position. Alternatively, or in addition, the support member may be arranged to engage (e.g. in the supporting position) with one or more walls of the elevator car, in order to support the working platform from below.

In some examples, the support member comprises at least one leg. In some examples, the support member comprises two legs, arranged next to each other along the same side of the working platform. It will be appreciated that the legs need not be positioned right at the outer perimeter of the working platform, but rather they are both arranged close to this side. The two legs may be connected together, for example by one or more cross-bars extending between them. The cross-bars may provide the steps on the support member, discussed below.

In some examples, the support member discussed above is a first support member, and the elevator car further comprises a second support member. The second support member may have any of the features described above with reference to the first support member. The first support member and the second support member may be arranged at opposite ends of the working platform. By this it will be understood that the support members are arranged towards opposite ends (i.e. sides) of the same face (the lower face) of the working platform.

In some examples, the elevator car comprises a mounting frame, arranged on a lower surface of the working platform. The (or each) support member may be mounted to the mounting frame (e.g. hingedly mounted). The mounting frame may be arranged such that the support members are accommodated within (i.e. not extending further down than) the mounting frame when the support members are in the stowed position.

In some examples, the support member comprises one or more steps (e.g. rungs). This may allow a maintenance person to climb up onto the working platform by ascending the steps of the support member, when the support member is in the supporting position (and the working platform is in the operational position). The elevator car may comprise an elevator door, through which the interior space is accessed (e.g. by passengers). The support member comprising one or more steps may be positioned adjacent the elevator door. Thus, the support member comprising one or more steps may be positioned adjacent to an edge of the working platform closest to the elevator door.

The size of the working platform relative to the interior size of the elevator car (i.e. between the interior walls of the elevator car) may be important for safety purposes. If the gap between an edge of the working platform and an adjacent wall of the elevator car is sufficiently small, a maintenance person may be able to work safely standing on the working platform without additional safety equipment, such as a safety bannister or balustrade.

Thus, in some examples, the interior space has an interior space depth and the working platform has a working platform depth. The working platform depth may be less than 300 mm smaller than the interior space depth. The working platform depth may be at least 200 mm smaller than the interior space depth, optionally at least 300 mm smaller.

Similarly, in some examples the interior space has an interior space width and the working platform has a working platform width. The working platform width may be less than 300 mm smaller than the interior space width. The working platform width may be at least 200 mm smaller than the interior space width, optionally at least 300 mm smaller.

Thus, a gap between an edge (or each edge) of the working platform and an (or each) interior wall of the elevator car may be less than 150 mm and/or more than 100 mm (e.g. for a centrally arranged working platform). There may be a gap of (approximately) 150 mm between each edge of the working platform and the respective adjacent internal wall of the elevator car.

The interior space may be defined by interior walls of the elevator car, wherein the interior walls define the interior space depth and/or the interior space width.

In some examples, the elevator car further comprises a decorative ceiling cover, arranged to cover the working platform when the working platform is in the stowed position. The decorative ceiling cover may be hingedly connected to an upper part of the elevator car (e.g. to the support frame), and it may be arranged to move (e.g. hinge) between a closed position in which the working platform is covered, and an open position in which the working platform is accessible (and visible).

In some examples, the elevator car further comprises a locking portion (e.g. one or more latches) arranged to hold the working platform in the stowed position (i.e. in addition or alternatively to the stopper mechanism described above). Thus, when stowed in the stowed position the working platform may still be suspending by the tension members (i.e. by the suspending portions) or alternatively, may be (partially or fully) supported by the locking portion.

In some examples, the elevator car further comprises a stopper portion (e.g. a knot in the one or more tension members) arranged to prevent movement of the working platform to a position lower than the operational position (i.e. to prevent movement beyond the operational position). This may be provided in addition or alternatively to the stopper mechanism described above.

According to a second aspect of this disclosure there is provided a method of moving a working platform of an elevator car between a stowed position above an interior space defined by the elevator car, for accommodating passengers and/or cargo, and a position within the interior space in which the working platform is usable by a maintenance person, the method comprising: moving the working platform between the stowed position and an operational position, within the interior space, using a tension member; and moving a support member between a stowed position and a supporting position, wherein the support member is arranged to support the working platform from below when the support member is in the supporting position and the working platform is in the operational position.

Using the tension member to move the working platform between the stowed position and the operational position may comprise using the tension member (e.g. actuating or moving the tension member) to alter the length of a suspending portion of the tension member, extending between the working platform and an upper part of the elevator car.

The method may further comprise opening and/or closing the decorative ceiling over of the elevator car.

The method may further comprise releasing and/or engaging the stopper mechanism of the elevator car.

It will be appreciated that this method may be used as a method of deploying a working platform of an elevator car from a stowed position above an interior space defined by the elevator car, for accommodating passengers and/or cargo, to a position within the interior space in which the working platform is usable by a maintenance person, the method comprising: lowering the working platform from the stowed position to an operational position, within the interior space, using the tension member (e.g. by actuating a tension member to increase the length of a suspending portion extending between the working platform and an upper part of the elevator car); and moving a support member from a stowed position to a supporting position, such that in the supporting position the support member supports the working platform from below.

It will further be appreciated that this method may be used as a method of stowing a working platform of an elevator car from a position within an interior space defined by the elevator car, for accommodating passengers and/or cargo, in which the working platform is usable by a maintenance person, to a stowed position above the interior space, the method comprising: moving a support member from a supporting position, in which the support member supports the working platform from below, to a stowed position; and moving the working platform from an operational position, within the interior space, to the stowed position using the tension member (e.g. by actuating (e.g. pulling) a tension member to decrease the length of a suspending portion extending between the working platform and an upper part of the elevator car).

It will be appreciated that features described above in relation to the elevator car and elevator system may likewise be present in the described method, and likewise features described in relation to the method may be present in the described elevator car and elevator system.

DETAILED DESCRIPTION

Certain preferred examples of this disclosure will now be described, by way of example only, with reference to the accompanying drawings, in which.

DETAILED DESCRIPTION

Figure 1:
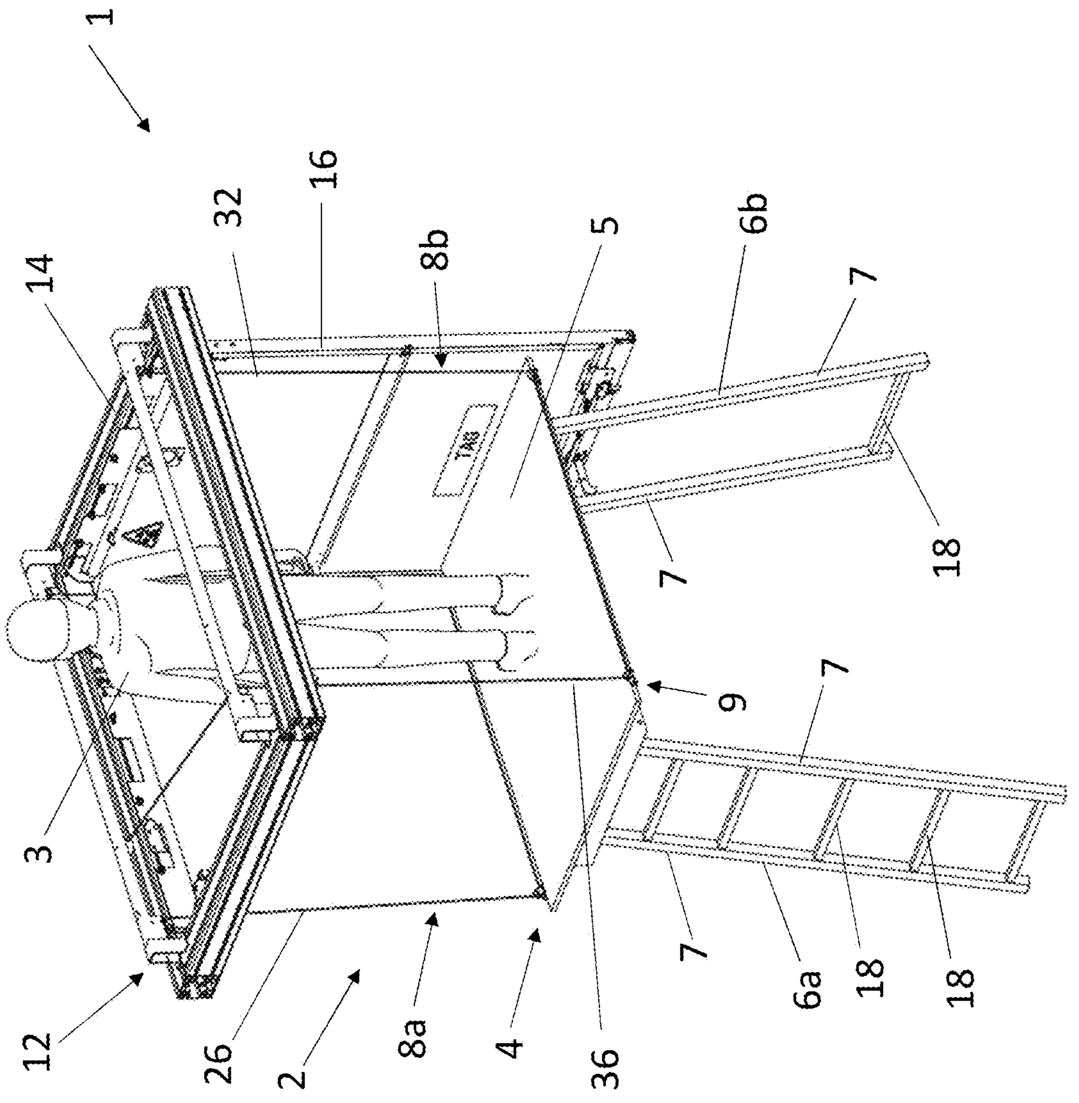
FIG. 1 shows a perspective view from slightly above of certain components of an elevator car including a working platform, according to an example of the present disclosure.

FIG. 1 is a perspective view showing certain components of an elevator car 1. The elevator car 1 defines an interior space 2 for accommodating passengers and/or cargo. The elevator car 1 includes a working platform 4 that is moveable between a stowed position (shown in FIG. 4), above the interior space 2, and an operational position (shown in FIGS. 1, 6, 7 and 8), within the interior space 2.

Figure 7:
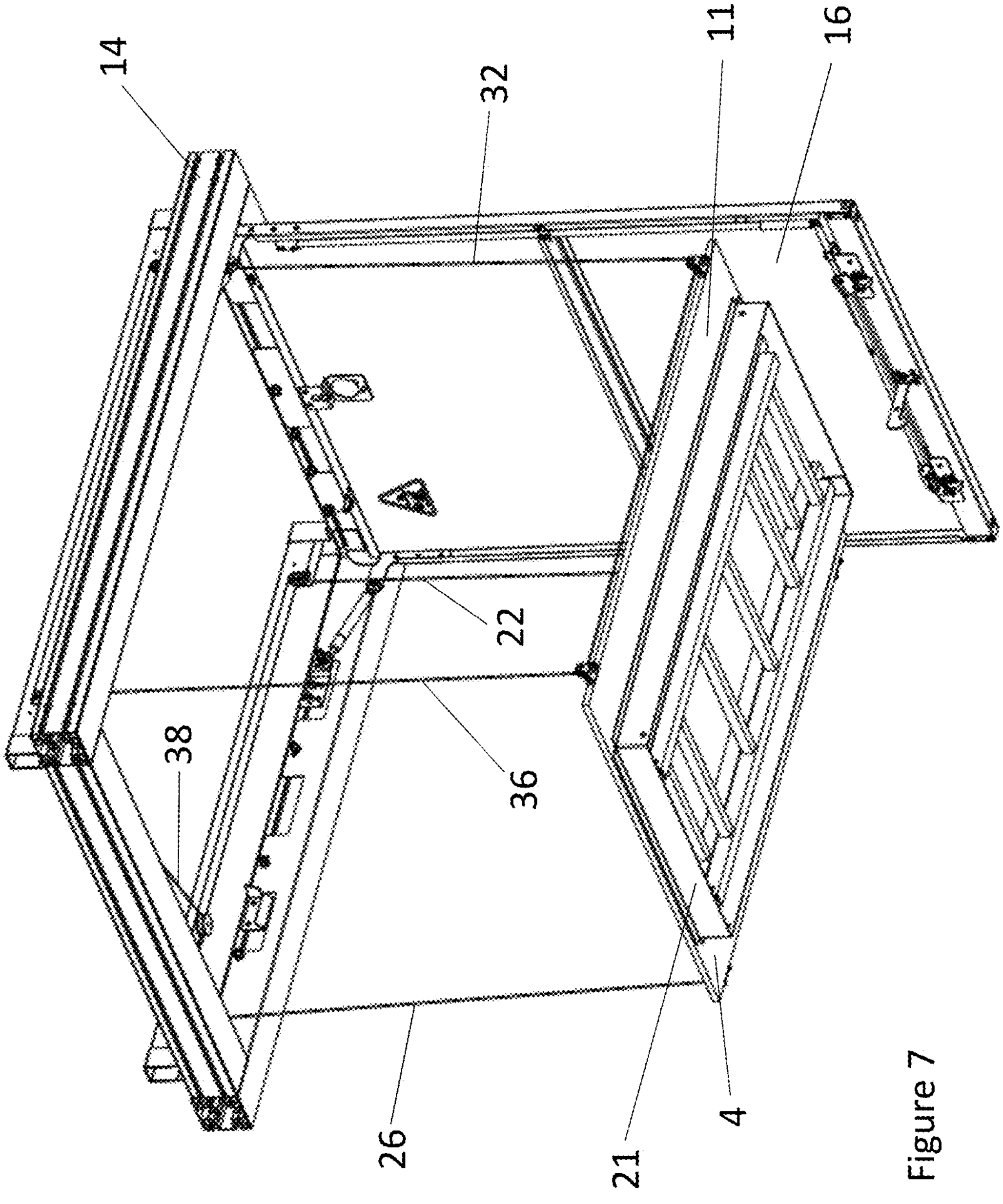
FIG. 7 is a perspective view from slightly below showing the working platform of FIG. 1 in the operational position.

The working platform 4 has a top surface 5 and a lower surface 11 (seen in FIG. 7). The top surface 5 is the surface on which a maintenance person 3 stands to carry out maintenance operations when using the working platform 4, i.e., the surface of the working platform 4 which faces towards the ceiling of the elevator car 1. The lower surface 11 is the surface of the working platform 4 which faces downwards, i.e. towards the floor of the elevator car 1.

Attached to the working platform 4 (in a hinged arrangement) there is a first support member 6*a* and a second support member 6*b*, both arranged on the underside of the working platform 4 (with reference to its configuration once arranged within an elevator car 1) and arranged respectively at opposite ends of the working platform 4. The support members 6*a*, 6*b* are arranged to support the working platform 4, from below, when the working platform is in the operational position and the support members 6*a*, 6*b* are in the supporting position, as illustrated in FIG. 1, and discussed further below.

Each support member 6*a*, 6*b* includes two support member legs 7, which are connected together by at least one cross-bar 18. The first support member 6*a* includes multiple such cross-bars 18, which provide steps or rungs, which a maintenance person may ascend or descend when accessing or leaving the working platform 4. The door of the elevator car 1 is not visible in FIG. 1, but the first support member 6*a* is arranged adjacent to the door, i.e. on the side closest the door, for easy access to the steps by the maintenance person.

The elevator car 1 also includes at least one tension member—in this case the elevator car 1 includes a first tension member 8*a* and a second tension member 8*b*. The elevator car 1 includes a support frame 14, arranged above the interior space 2 of the elevator car 1. The tension members 8*a*, 8*b* attach to the support frame 14, extend down to the working platform 4, through various deflection sheaves 9 provided on the working platform, then extend back up to the support frame 14 and to a stopper mechanism 12 that is attached to the support frame 14, as discussed in greater detail below.

Figure 2:
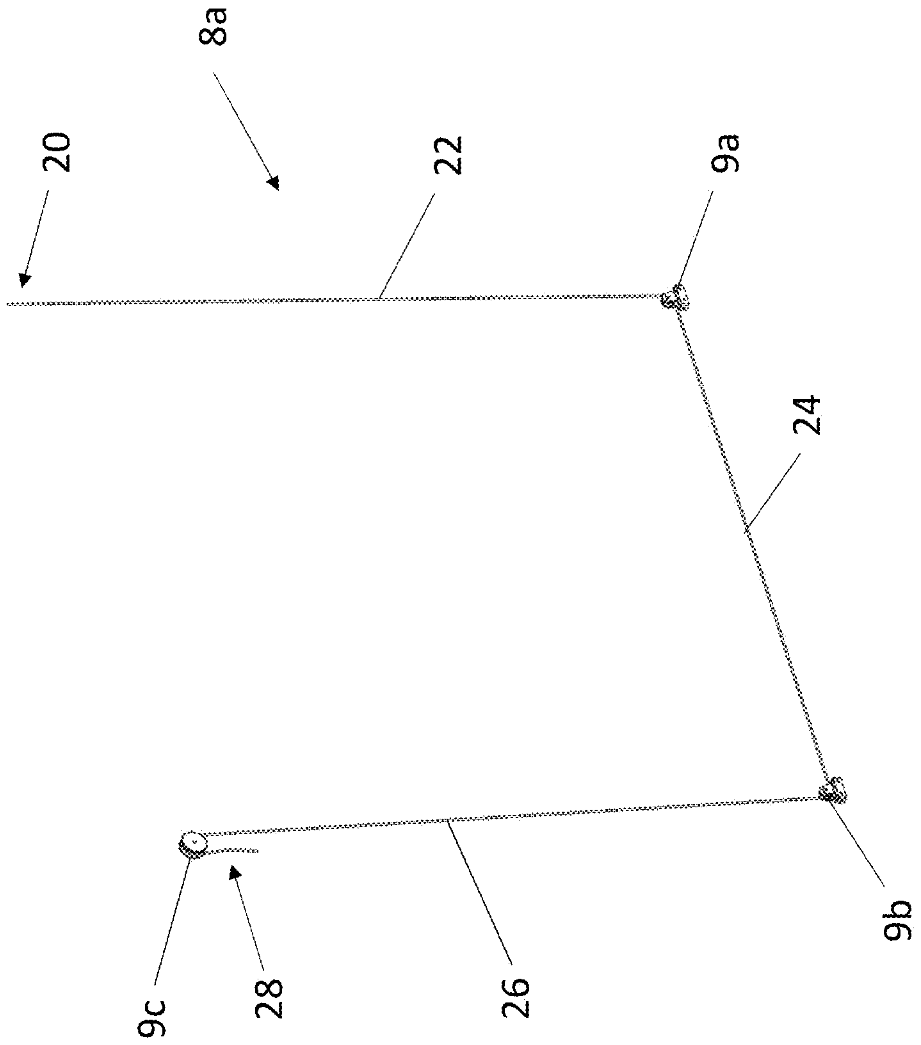
FIG. 2 shows a first tension member of the elevator car of FIG. 1.

For clarity, the first tension member 8*a* is shown on its own in FIG. 2. A first end 20 of the tension member 8*a* is fixed to the support frame 14 (not shown in FIG. 2). A first portion 22 of the tension member 8*a*, which may be referred to as a "suspending" portion, extends downwards from the support frame 14 to a first deflection sheave 9*a*, which is attached to the working platform 4. The tension member 8*a* (i.e. a second portion 24 of the tension member 8*a*) extends along a length of the working platform 4, to a second deflection sheave 9*b*. From there, a third portion 26 of the tension member 8*a*, providing a second suspending portion, extends upwards to a third deflection sheave 9*c*, fixed to the support frame 14. The third deflection sheave 9*c* may form part of a stopper mechanism 12 that is described in greater detail below. A second end 28 of the first tension member 8*a* is located past the third deflection sheave 9*c*.

Figure 3:
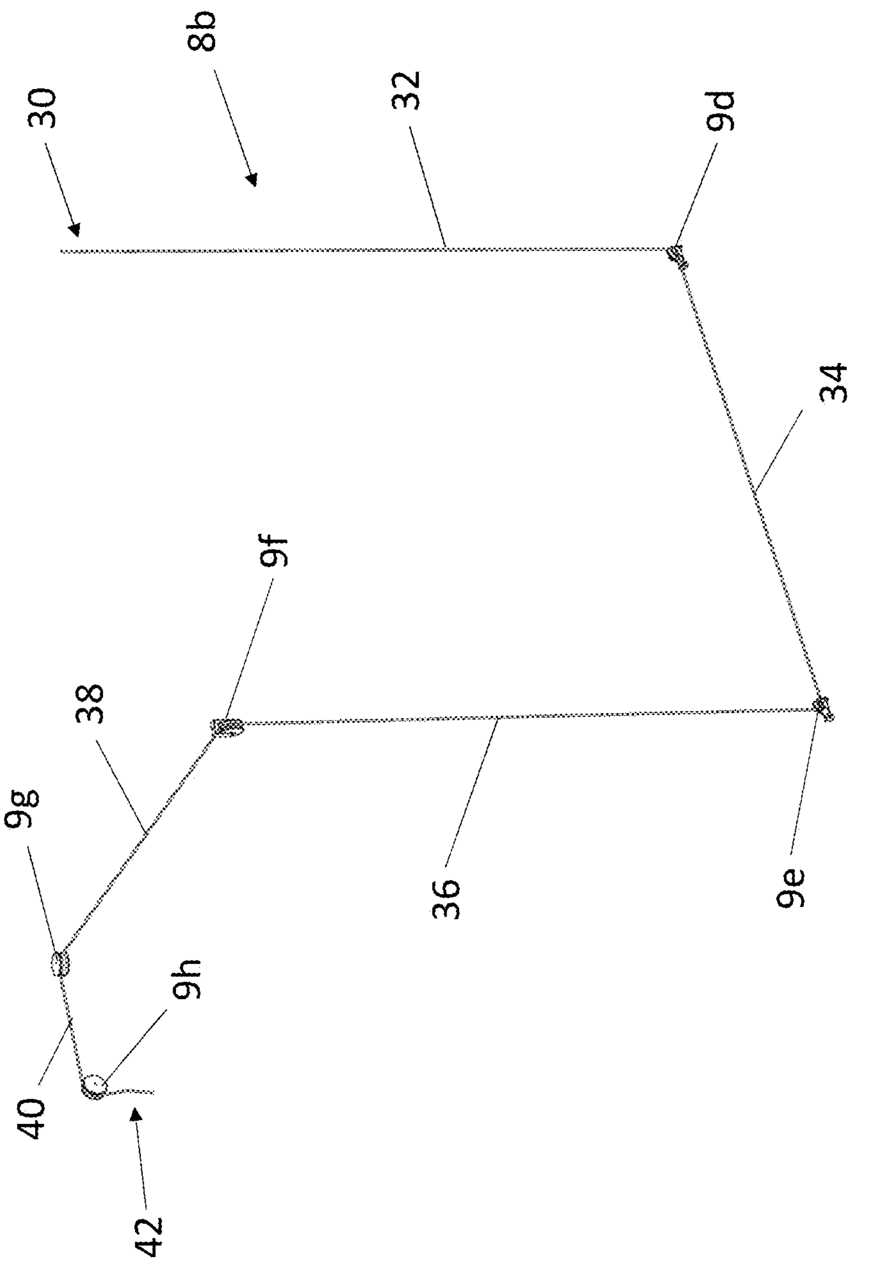
FIG. 3 shows a second tension member of the elevator car of FIG. 1.
Figure 4:
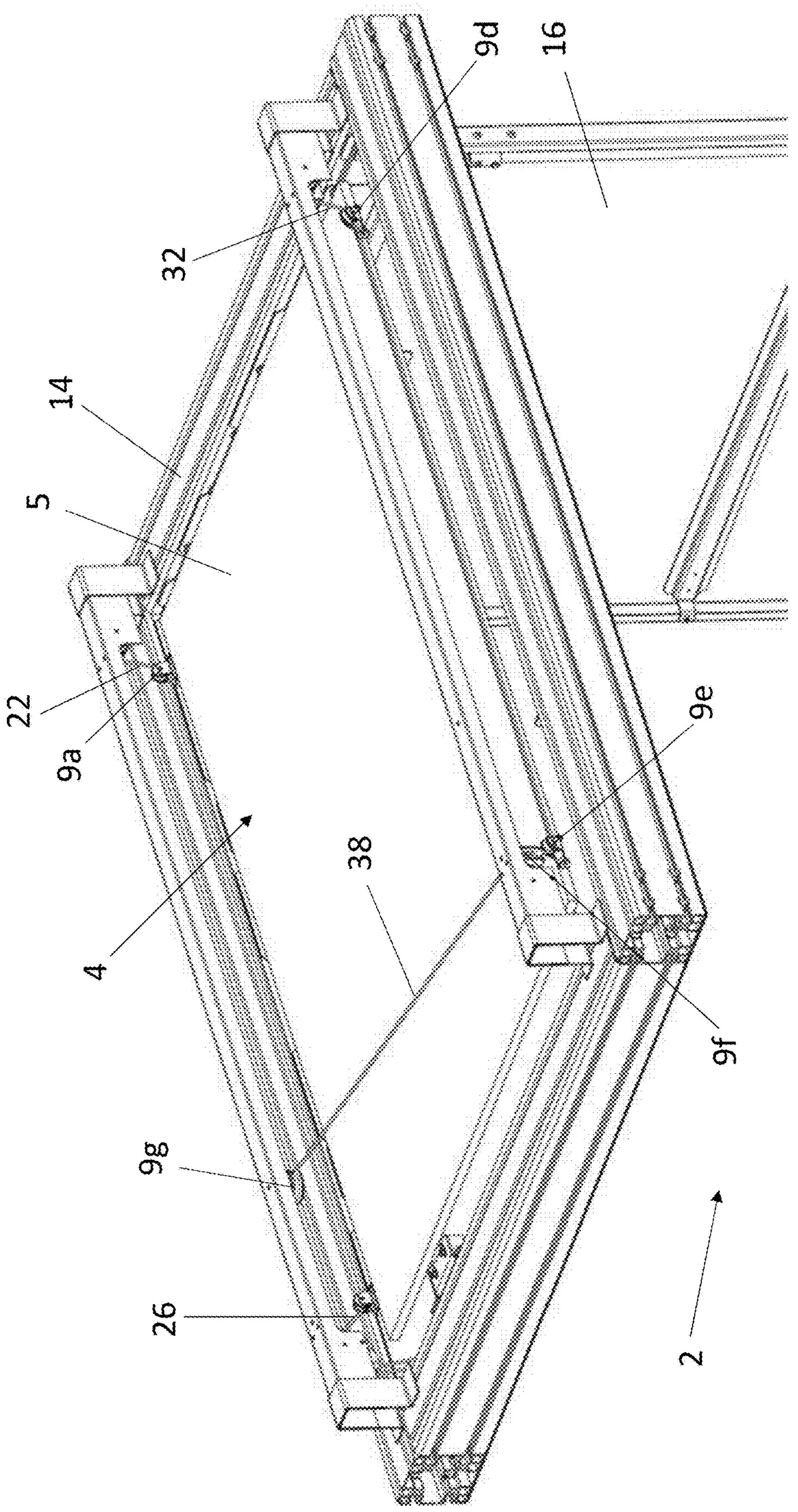
FIG. 4 is a perspective view from slightly above showing the working platform of FIG. 1 in the stowed position.

The second tension member 8*b* is shown on its own in FIG. 3. A first end 30 of the tension member 8*b* is fixed to the support frame 14 (not shown in FIG. 3). A first portion 32 of the second tension member 8*b*, which may be referred to as a "suspending" portion, extends downwards from the support frame 14 to a first deflection sheave 9*d*, which is attached to the working platform 4. The tension member 8*b* (i.e. a second portion 34 of the tension member 8*b*) extends along a length of the working platform 4, to a second deflection sheave 9*e*. From there, a third portion 36 of the tension member 8*b*, providing a second suspending portion, extends upwards to a third deflection sheave 9*f*, fixed to the support frame 14. From there, a fourth portion 38 of the tension member extends across the width of the elevator car 1 (i.e. across the width of the support frame 14) to a fourth deflection sheave 9*g*. The fourth portion 38 of the tension member extends across above the first tension member 8*a* (to be further towards the outside of the elevator car 1 compared to the first tension member 8*a*), as seen in FIG. 4. The rotational axis of the fourth deflection shave extends substantially vertically, which differs from the rotational axes of the other deflection sheaves, which extend substantially horizontally (albeit not parallel to one another). A fifth portion 40 of the tension member 8*b* further extends to a fifth deflection sheave 9*h*, which again has a substantially horizontal axis of rotation. A second end 42 of the second tension member 8*b* is located past the fifth deflection sheave 9*h*. The fifth deflection sheave 9*h* may be positioned adjacent to the third deflection sheave 9*c* of the first tension member 8*a*, shown in FIG. 2, and may form part of a stopper mechanism 12 that is described in greater detail below.

By moving (or enabling movement) of a second ends 28, 42 of the first and second tension members 8*a*, 8*b*, a maintenance person can control the lengths of the suspending portions 22, 26, 32, 36 and thereby lift or lower the working platform 4. When the maintenance person pulls (e.g. pulls downwards) on the second ends 28, 42, the suspending portions 22, 26, 32, 36 will get shorter, and so the working platform will be lifted upwards. When the maintenance person "lets out" the second ends 28, 42 (i.e. enables their movement upwards), the working platform 4 is lowered towards the operational position. Although active actuation (e.g. by winding in and out of the tension member) may be present in some examples, in the illustrated example the working platform 4 is biased towards the operational (i.e. lower) position by gravity. Therefore, all the maintenance person needs to do to lower the working platform is release the second ends 28, 42 for movement (and optionally let them out in a controlled manner in order to control lowering of the working platform). Movement of the working platform 4 may be enabled by releasing a stopper mechanism 12 which is biased to prevent movement of the tension members 8*a*, 8*b*. The operation of the stopper mechanism 12 is discussed in greater detail below, with reference to FIGS. 9 and 10.

FIG. 4 shows the working platform 4 in the stowed position, above the interior space 2. In this position, the working platform 4 is accommodated within a centre cavity formed or defined by the support frame 14. As a result, the working platform 4 may be accommodated in this position when not in use, i.e. when the elevator system is in normal use and passengers may be present within the elevator car 1, without the working platform 4 being an obstruction, and also without occupying much (or possibly any) more vertical space than is already required for the support frame 14.

Part of a decorative ceiling cover 16 is visible in the view of FIG. 4 (and is also shown in FIG. 1). Both of these Figures show the decorative ceiling cover 16 in the open position (i.e. such that the working platform 4 is visible and accessible from within the interior space 2). It will be appreciated that the decorative ceiling cover 16 may be hinged into a closed position, in which the working platform 4 is covered and is neither visible nor accessible. This improves the interior appearance of the elevator car 2 for passengers using the elevator car 1, and also improves safety since passengers cannot easily access the components associated with the working platform 4. It can be seen that in this stowed position the suspending portions 22, 26, 32, 36 are very short, and a number of the deflection sheaves are therefore close together.

Figure 5:
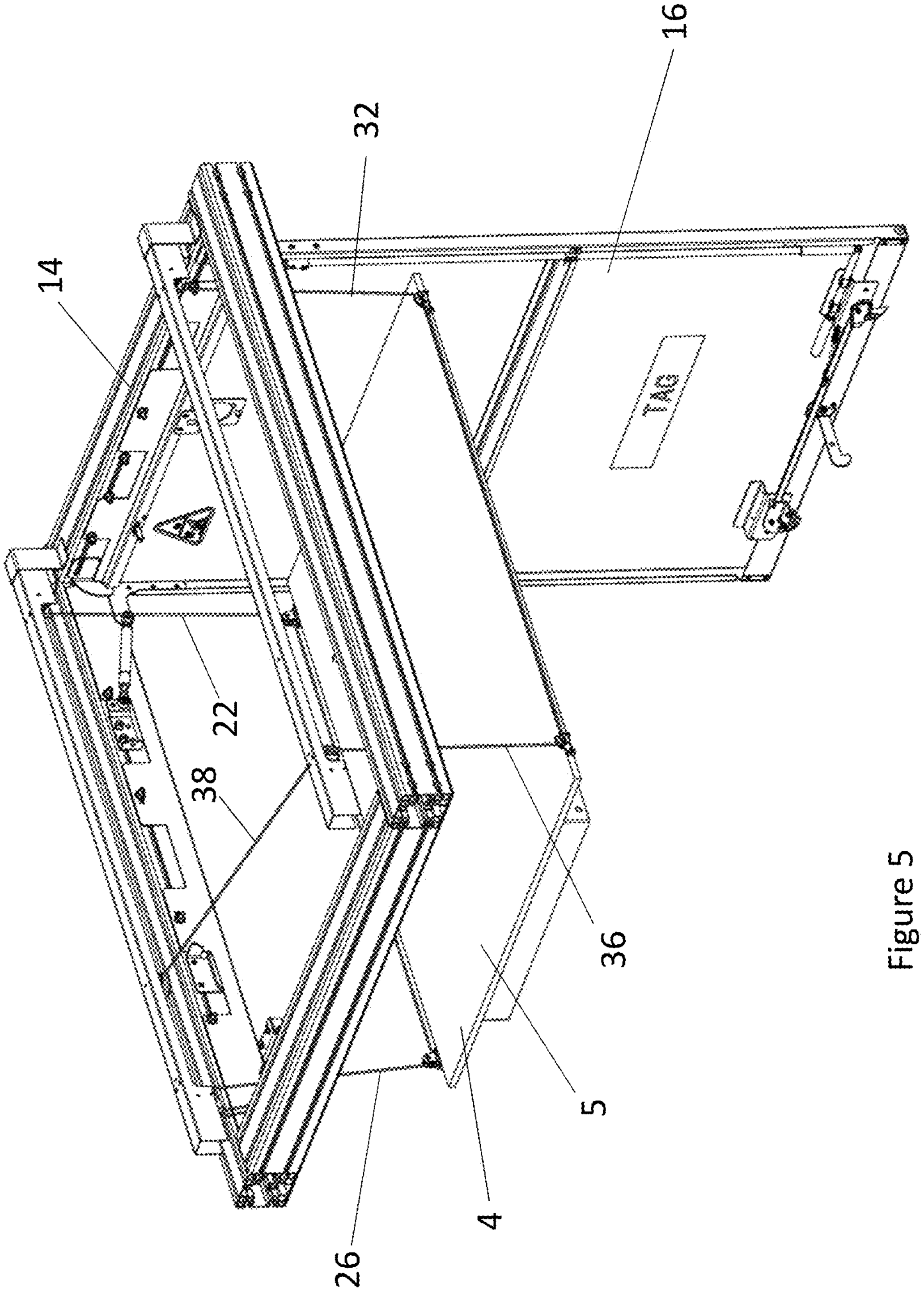
FIG. 5 is a perspective view from slightly above showing the working platform of FIG. 1 between the stowed position and the operational position.

FIG. 5 shows the working platform 4 between the stowed position and the operational position.

Figure 6:
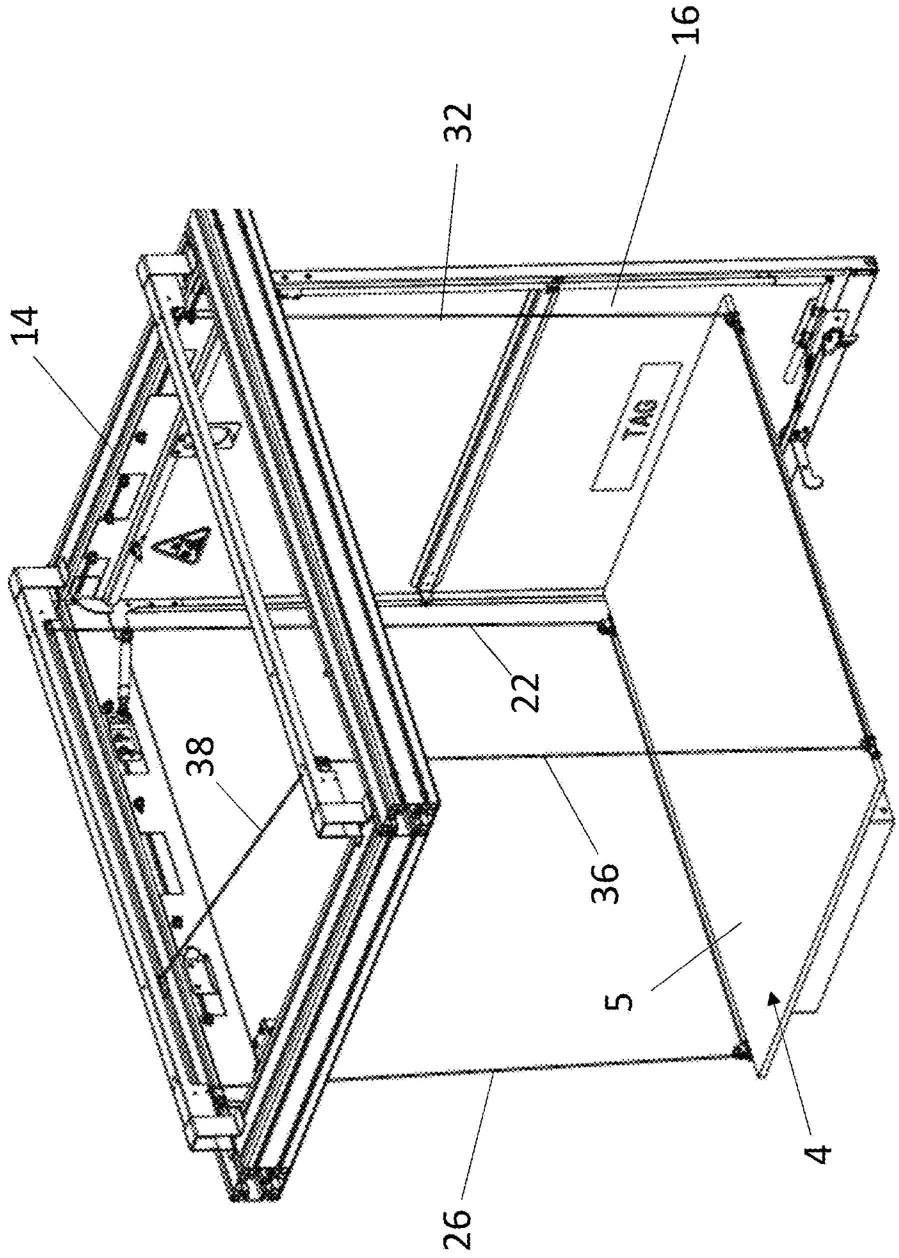
FIG. 6 is a perspective view from slightly above showing the working platform of FIG. 1 in the operational position.

FIG. 6 shows the working platform 4 at the operational position (i.e. at the operational height), but with the support members still in the stowed position. Thus, although the working platform 4 is at the operational position, it is not yet ready for use by a maintenance person, since for use its weight must be supported by the support members. FIG. 7 shows the components of FIG. 6, but is a perspective view from slightly below. From this view, the support members 6*a*, 6*b* are visible, in the stowed position. As seen in FIG. 7, the elevator car 1 includes a mounting frame 21, arranged on the lower surface 11 of the working platform 4. Each support member 6*a*, 6*b* is hingedly mounted to the mounting frame 21. The mounting frame 21 is arranged so that the support members 6*a*, 6*b* are accommodated within the mounting frame 21 when the support members 6*a*, 6*b* are in the stowed position (i.e. folded up against the working platform 4).

Figure 8:
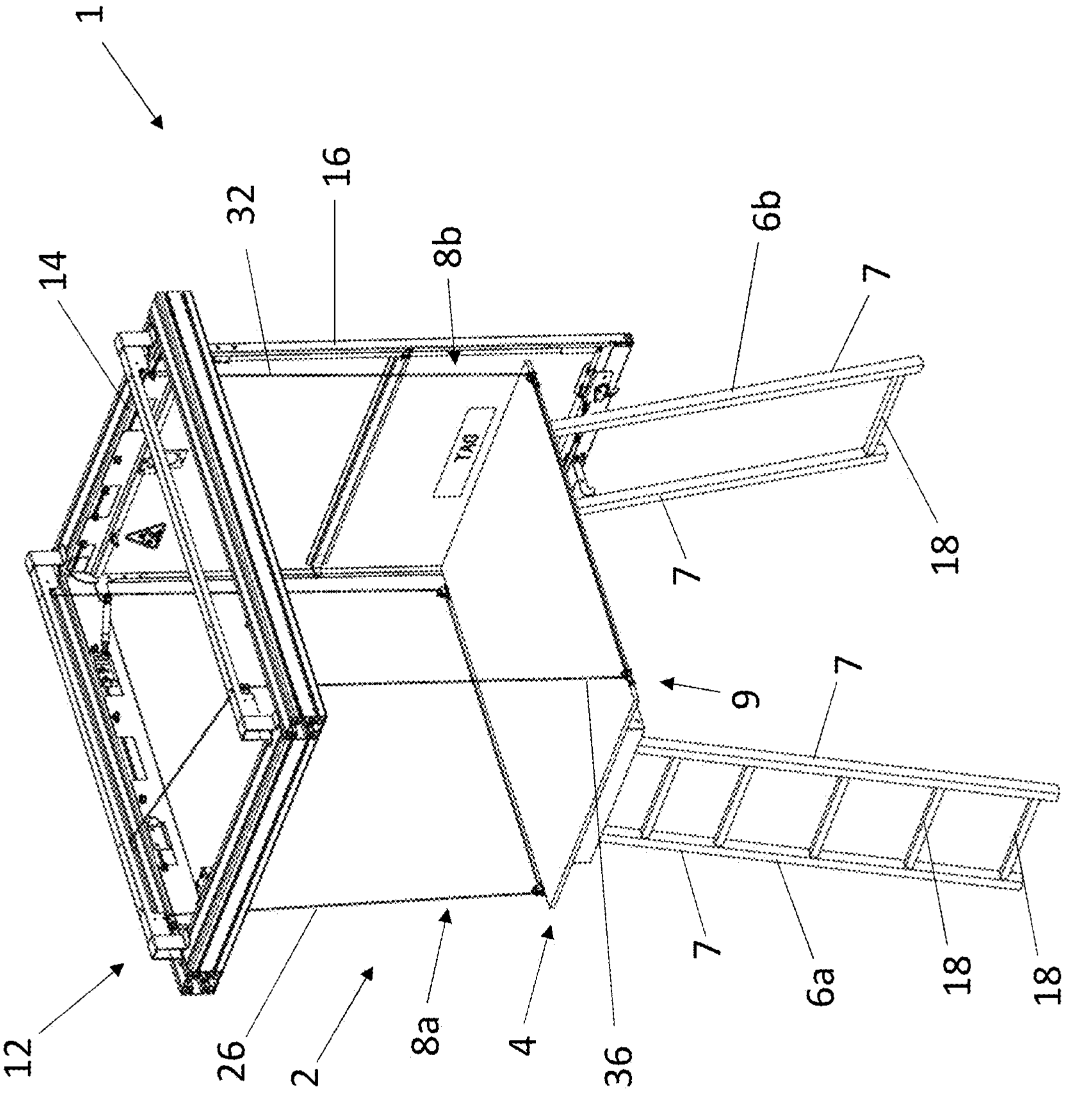
FIG. 8 is a perspective view from slightly above showing the working platform of FIG. 1 in the operational position, with the supporting members in the supporting position.

FIG. 8 shows the working platform ready for use by a maintenance person. In particular, the working platform 4 is in the operational position (i.e. at the operational height) and the support members 8*a*, 8*b* have been unfolded into the supporting position in which they extend away from the working platform 4 and rest on a floor of the elevator car 1 (not shown) so as to support the weight of the working platform 4 (and any people or objects on the working platform) from below.

Figure 9:
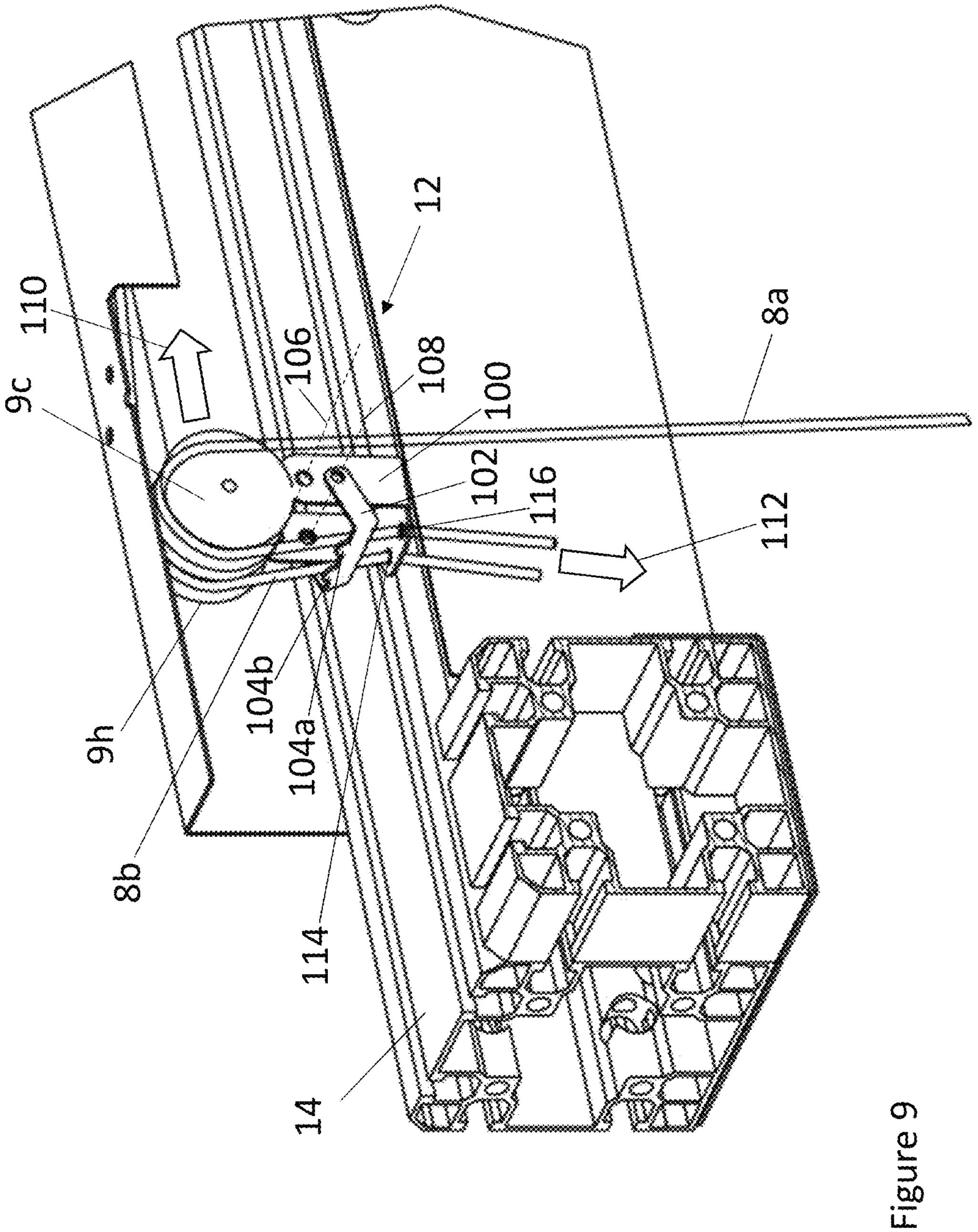
FIG. 9 is a perspective view of the stopper mechanism of FIG. 1, in the open configuration.
Figure 10:
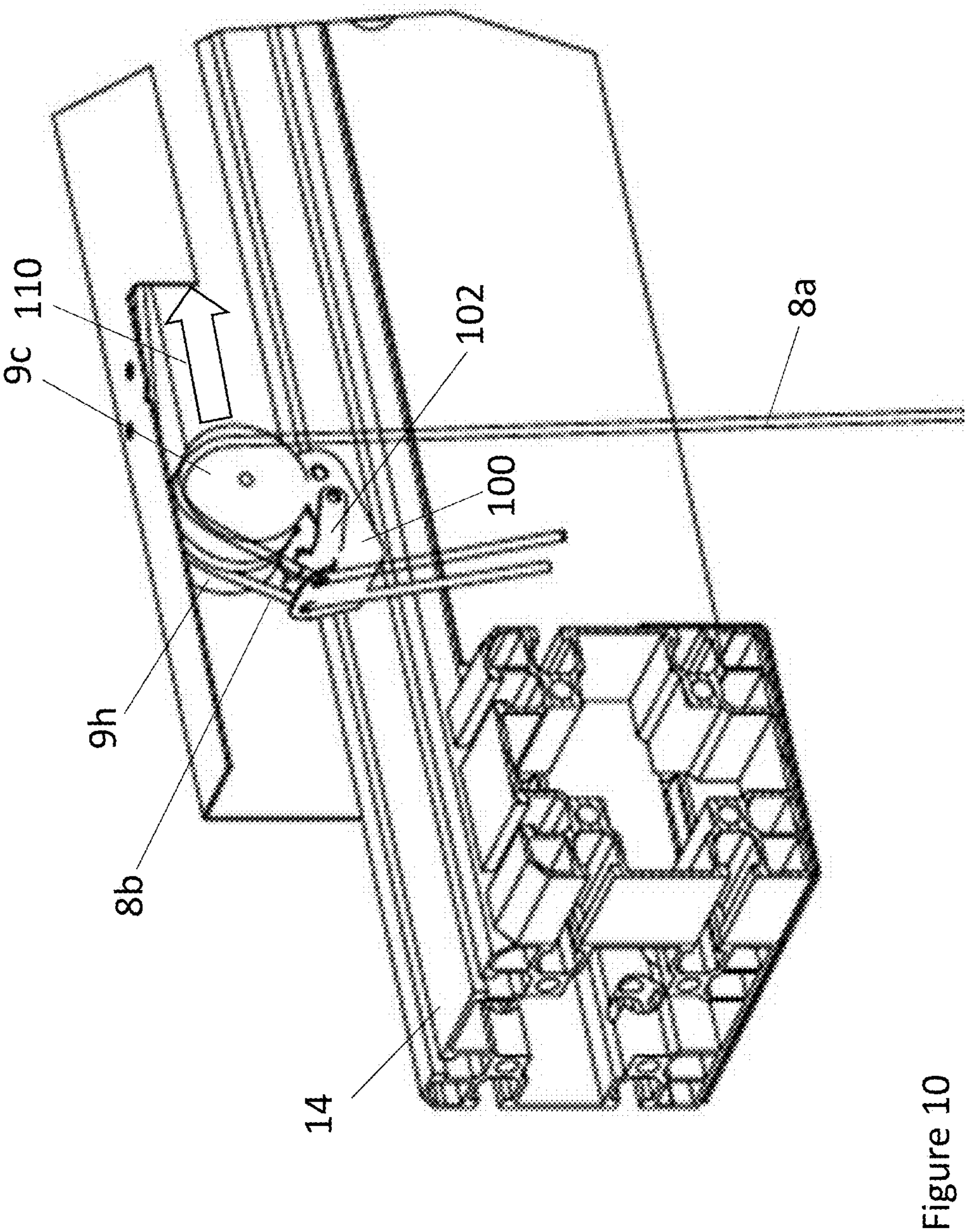
FIG. 10 is a perspective view of the stopper mechanism of FIG. 1, between the open configuration and the closed configuration.

FIGS. 9 and 10 illustrate the operation of the stopper mechanism 12 in greater detail.

The stopper mechanism 12 includes an activation portion 100, and an engagement portion 102. The engagement portion 102 includes two protrusions 104*a*, 104*b*.

The activation portion 100 is pivotably connected to the third deflection sheave 9*c* associated with the first tension member 8*a* (over which the first tension member 8*a* passes) and to the fifth deflection sheave 9*h* associated with the second tension member 8*b* (over which the second tension member 8*b* passes). The activation portion 100 is pivotably connected to an outer housing of the deflection sheaves (i.e. a non-rotating part) such that it can rotate relative to a pivot axis 106.

The engagement portion 102 is pivotably attached (e.g. by a pin connection) to the activation portion 100, so as to rotate about a pivot axis 108.

The protrusions 104*a*, 104*b* on the engagement portion 102 are shaped and positioned so that when the engagement portion 102 is rotated around into its closest position to the deflection sheaves 9*c*, 9*h*, the protrusions 104*a*, 104*b* respectively extend into the grooves of each of the deflection sheaves 9*c*, 9*h*, that accommodate the respective tension members 8*a*, 8*b*, so that the tension member 8*a*, 8*b* is pressed against the surface of the groove, increasing friction and ultimately engaging with the tension member 8*a*, 8*b* so as to prevent movement of the tension member 8*a*, 8*b* through the deflection sheave 9*c*, 9*h*.

Although one stopper mechanism 12 is provided which acts on both tension members 8*a*, 8*b*, it will be appreciated that a separate stopper mechanism could be provided, associated with each deflection sheave 9*c*, 9*h*. However, it is advantageous to provide one stopper mechanism 12 which stops motion of both tension members 8*a*, 8*b* together since this is easier for a user to operate, and since this helps to prevent uneven movement of the working platform 4, i.e. so that one side is lowered more than another, and it is no longer level during lowering.

FIG. 9 shows the stopper mechanism 12 in the open configuration—with the activation portion 100 rotated away from the deflection sheaves 9*c*, 9*h*, into a downwards position, and with the engagement portion 102 therefore out of contact with the tension members 8*a*, 8*b*.

A reaction force 110 acts on the deflection sheaves 9*c*, 9*h*, due to the weight of the working platform which is suspended by the tension members 8*a*, 8*b* (when it is not supported on the support members).

In the open configuration of FIG. 9, a user (e.g. a maintenance person) applies a downwards force 112 onto the second ends 28, 42 of the tension members 8*a*, 8*b*. The tension members 8*a*, 8*b* pass through respective holes 114, 116 in the activation portion 100. As a result, when the tension members 8*a*, 8*b* are acted on by the downwards force 112, pulling them into a substantially vertical arrangement, the activation portion 100 is rotated anticlockwise to a downwards position, such that the engagement portion 102 is moved to an open (i.e. non-engaging) position, seen in FIG. 9. In this position, the tension members 8*a*, 8*b* may move freely in either direction. For example, in addition to applying the downwards force 112 to the tension members 8*a*, 8*b* in order to move the activation portion 100 to the downwards position (so that the stopper mechanism 12 is in the open configuration), a user may apply a further pulling force to the second ends 28, 42 of the tension members 8*a*, 8*b* to lift the working platform 4, by shortening the suspension portions. Alternatively, having applied the downwards force 112 to move the stopper mechanism 12 to the open configuration, the user may let out the tension member, to let the working platform 4 move downwards under the force of gravity, with the tension members 8*a*, 8*b* controlling the motion, whilst applying the force needed to keep the tension members 8*a*, 8*b* aligned in the substantially vertical position shown in FIG. 9, to keep the stopper mechanism 12 open.

When a user ceases to apply force to the second ends 28, 42 of the tension members 8*a*, 8*b*, the stopper mechanism 12 moves as illustrated in the view of FIG. 10. The deflection sheaves 9*c*, 9*h* will rotate clockwise (with respect to the view of FIG. 9) due to the reaction force 110 acting on the tension members 8*a*, 8*b* causing the tension members 8*a*, 8*b* move across them. The tension members 8*a*, 8*b* will lift the activation portion 100 as they pass through the holes 114, 116 in the activation portion 100 (i.e. as a result of friction between the tension members 8*a*, 8*b* and the inner edges of the respective holes 114, 116), and thereby rotate it (clockwise) towards the deflection sheaves 9*c*, 9*h*. As a result of this movement the engagement portion 102 is moved towards the deflection sheaves 9*c*, 9*h* to the position shown in FIG. 10. Eventually the engagement portion 102 will be moved sufficiently that the protrusions 104*a*, 104*b* will contact, respectively, the tension members 8*a*, 8*b*, and prevent them from moving any further.

In this described example, the stopper mechanism 12 is moved to the closed configuration as a result only of the reaction force 110 produced by the weight of the working platform 4, causing friction between the tension members 8*a*, 8*b* and the edges of the holes 114, 116. However, in other examples, the stopper mechanism 12 may additionally (or alternatively) be biased towards the closed position (e.g. by a spring), and may be actuatable by a user, by any suitable mechanism or method, to an open configuration in which movement of the tension member(s) is enabled.

Figure 11:
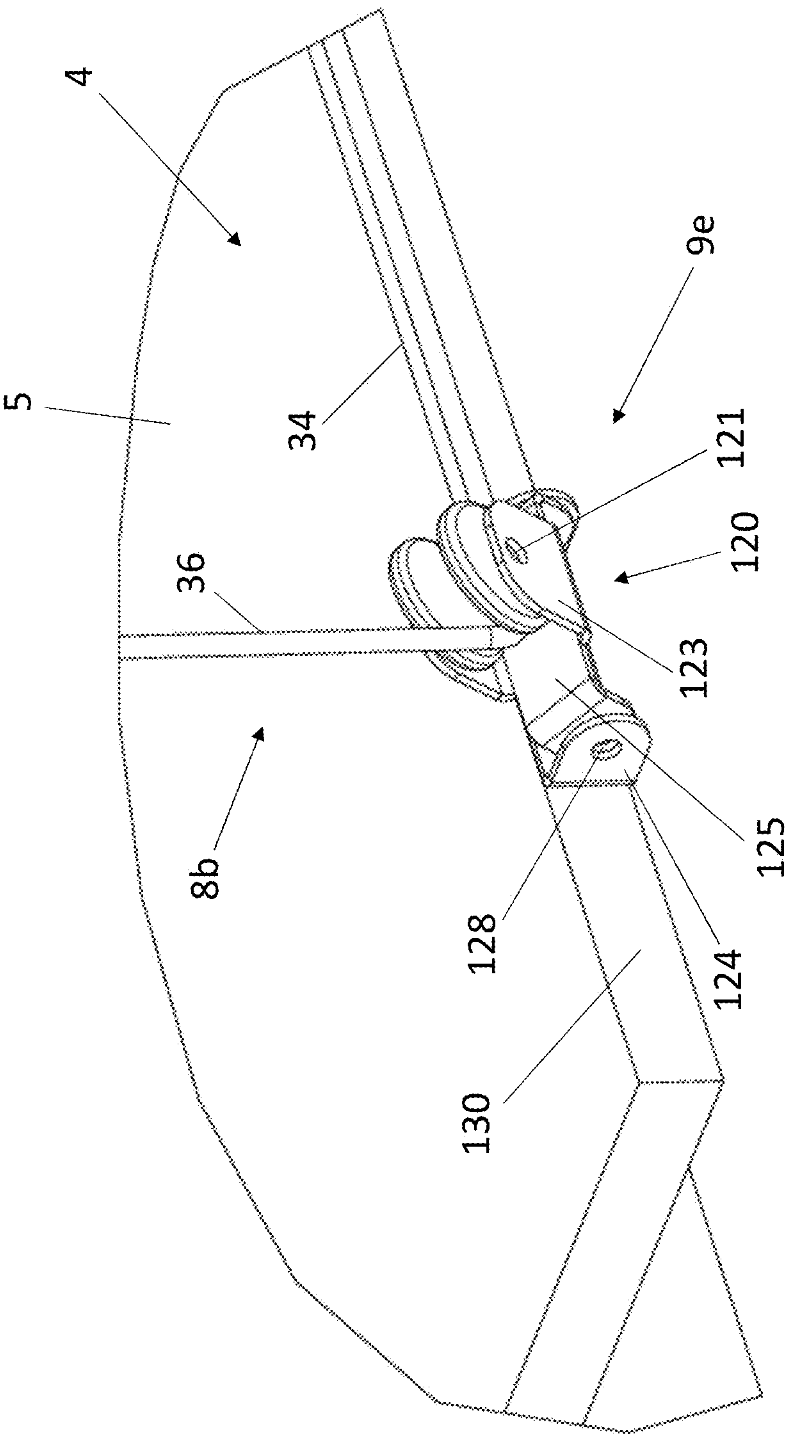
FIG. 11 is a perspective view of a deflection sheave of FIG. 1.

FIG. 11 is a perspective view of the second deflection sheave 9*c* associated with the second tension member 8*b*. This serves to illustrate a possible configuration which may be used for any of the deflection sheaves that are attached to the working platform 4, and further serves to illustrate an arrangement by which other deflection sheaves may be attached to components other than the working platform 4.

It can be seen that the deflection sheave 9*e* is mounted to a bracket 120, by a pin connection 121. Thus, the deflection sheave 9*e* is able to rotate, through a full 360° relative to the bracket 120. The bracket 120 includes a first U-shaped portion 123, extending around the deflection sheave 9*e*, through which the pin connection 121 passes. The bracket 120 further includes a second U-shaped portion 125, extending in an opposite direction to the first U-shaped portion, and rotated at 90° relative to the first U-shaped portion 123.

The bracket 120, in particular the second U-shaped portion 125, is connected to a second bracket 124 by a pin connection 128. The second bracket 124 is fixedly mounted to an edge 130 of the working platform 4. The pin connection 128 allows the bracket 120 to rotate relative to the second bracket 124 (and therefore relative to the working platform 4). This allows the angle of rotation axis of the deflection sheave 9*e* (which is the axis of the pin connection 121) to be varied by rotation of the bracket 120, relative to the working platform 4, so that the tension member 8*b* can be kept in suitable alignment throughout its motion. Furthermore, mounting the deflection sheave 9*e* using a second bracket 124 that is mounted along an edge 130 of the working platform 4, rather than on its top or bottom surface, maximises the available space on the working top surface 5 of the working platform 4, and avoids placing trip hazards on the surface on which the maintenance person 3 will be working.

Figure 12:
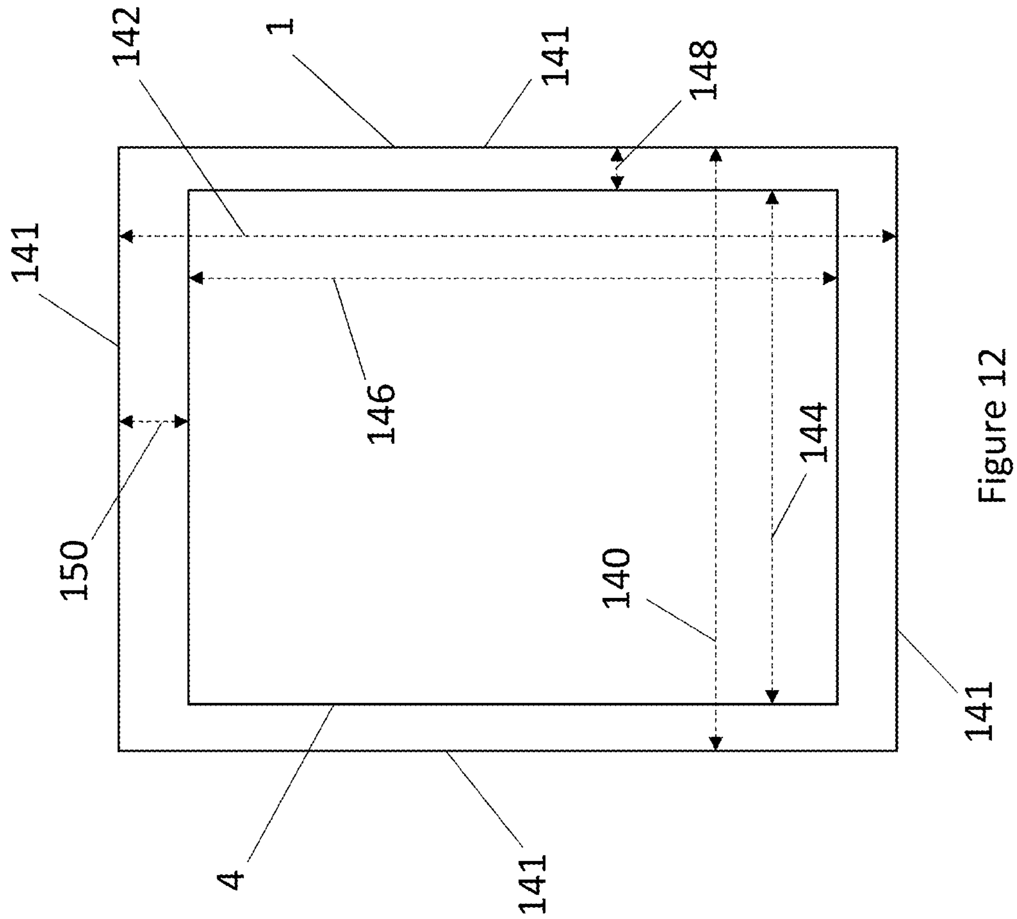
FIG. 12 is a schematic view from above showing the relative size of the elevator car and the working platform of FIG. 1.

FIG. 12 is a view from above showing the working platform 4 positioned within the elevator car 1. The elevator car has a width 140 and a depth 142, defined between interior walls 141 of the elevator car. The working platform has a width 144 and a depth 146. In this example, the difference in width between the elevator car 1 (i.e. the internal walls 141 of the elevator car) and the working platform 4, producing a width gap 148, is less than 300 mm. Similarly, the difference in depth between the depth 142 of the elevator car 1 (i.e. the internal walls of the elevator car) and the depth 146 of the working platform 4, producing a depth gap 150, is less than 300 mm. This has the advantage that a maintenance person can work safely (e.g. in accordance with safety regulations) standing on the working platform even where no bannister or balustrade is provided. These depth and width gaps 148, 150 give a maximum gap of 150 mm on either side of the working platform 4 (assuming that it is arranged centrally within the elevator car 1).

The depth and width gaps 148, 150 may be at least 200 mm in total (i.e. at least 100 mm on either side of a centrally positioned working platform 4). This gives sufficient clearance for the working platform 4 to be moved up and down freely even if there are parts protruding from the interior walls 141 of the elevator car, such as handrails.

Figure 13:
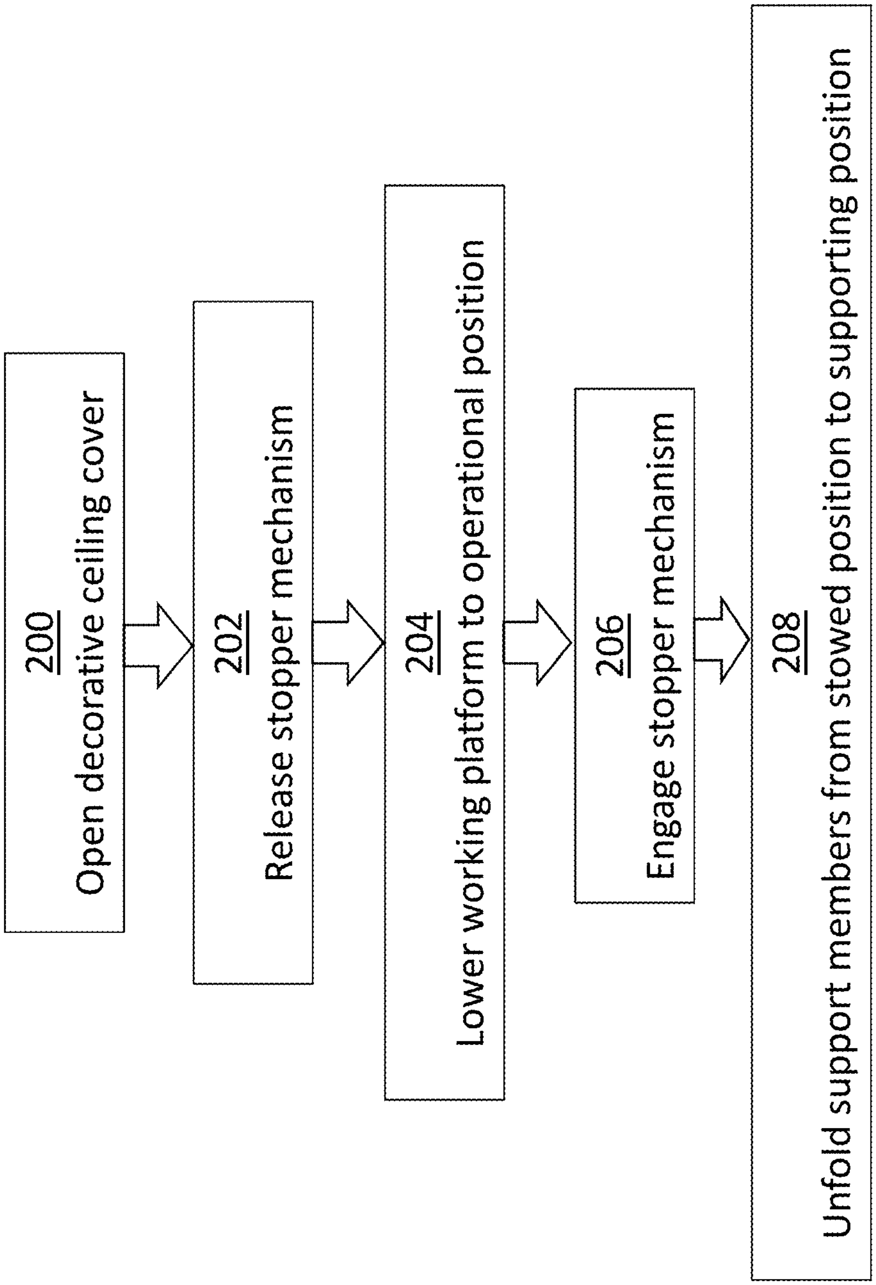
FIG. 13 is a flow diagram showing the stages of a method of deploying the working platform of FIG. 1.

FIG. 13 is a flow diagram showing the stages of a method of deploying the working platform of the present disclosure from the stowed position to a position in which it is usable by a maintenance person.

At a first stage 200, the decorative ceiling cover 16 is opened.

Next, at stage 202, the stopper mechanism 12 is released, as described above with reference to FIGS. 9 and 10. Although in this example it is the stopper mechanism which is engaged to hold the working platform 4 in the stowed position (as shown in FIG. 4) it will be appreciated that in other examples a separate lock (e.g. one or more latches) may be provided which engages with the working platform 4 when the working platform 4 is in the stowed position, and which holds the working platform 4 up in the stowed position until it is released. In such an example, stage 202 may further (or alternatively) include releasing the lock, to allow the working platform 4 to be moved from the stowed position.

Next, the user lowers the working platform 4 to the operational position (shown in FIGS. 6 and 7), by "letting out" the tension members, i.e. allowing the tension members to pass through the stopper mechanism in a controlled manner. This is stage 204.

Once the working platform 4 reaches the operational position the stopper mechanism 12 may be engaged to stop the working platform 4 from moving further downwards. This is shown as stage 206. Alternatively, a separate stopper may be provided, which prevents the working platform 4 from moving further downwards than the operational height. For example, there may be stoppers or knots provided on one or both of the tension members 8*a*, 8*b*, which prevent movement of the working platform 4 lower than the operational position. However, it will be appreciated that since the tension members 8*a*, 8*b* are not required to support the working platform 4 during its use, no stopper mechanism is strictly necessary. Instead, the user could proceed directly to step 208, described below, in which the support members 6*a*, 6*b* are moved to support the working platform 4. Once the working platform 4 is being supported by the support members 6*a*, 6*b*, there will be (substantially) no downwards force acting on the tension members 6*a*, 6*b*, since the weight of the working platform 4 will no longer be acting on them, and therefore no mechanism will be needed to prevent their further motion.

As already mentioned, at stage 208, the user unfolds the support members 6*a*, 6*b* from the stowed position (shown in FIG. 7), in which the extend substantially parallel to the working platform, to the supporting position (shown in FIG. 8) in which they extend away from the working platform 4 and rest on the floor of the elevator car 1 so as to support the weight of the working platform 4 from below.

Figure 14:
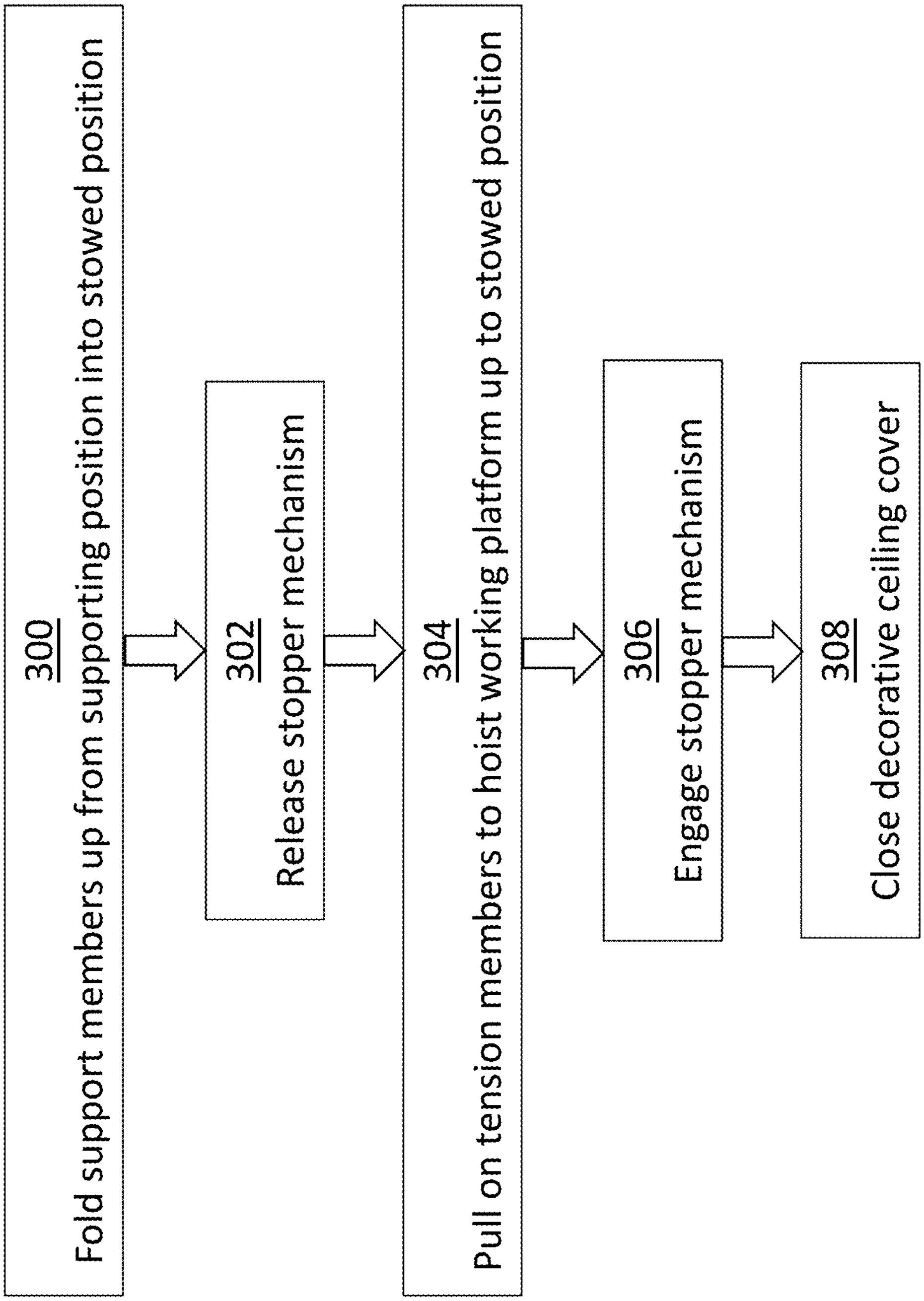
FIG. 14 is a flow diagram showing the stages of moving the working platform of FIG. 1 from a position in which it is usable by a maintenance person to the stowed position.

FIG. 14 is a flow diagram showing the stages of a method of moving the working platform of the present disclosure from a position in which it is usable by a maintenance person to the stowed position.

First, at stage 300, the user folds the support members 6*a*, 6*b* from the supporting position (shown in FIG. 8) to the stowed position (shown in FIG. 7). In order to carry out this stage safely, another mechanism must be in place to support the weight of the working platform 4 when the support members 6*a*, 6*b* are removed from their supporting position. In this example, the stopper mechanism 12 will be engaged, to prevent movement of the tension members 8*a*, 8*b*, such that when the support members 6*a*, 6*b* are moved to no longer support the weight of the working platform 4, the tension members 8*a*, 8*b* will be put under tension and will support this weight. Alternatively, the user could simply hold the second ends 28, 42 of the tension members 8*a*, 8*b* so that they are unable to move under the weight that acts on them once the support members 6*a*, 6*b* are moved. Or, as discussed above, some other method or mechanism may be provided which prevents movement of the working platform 4 beyond the operational height, e.g. knots in the tension members.

Next, at stage 302 the stopper mechanism 12 (if present) is released. As discussed above, there may be examples in which the stopper mechanism is not required to hold the working platform 4 at the operational height. In such examples there may be no need to release the stopper mechanism 12 at stage 302.

At stage 304, the user pulls on the tension members 8*a*, 8*b* (i.e. on the second ends 28, 42 of the tension members 8*a*, 8*b*) so as to shorten the length of the suspending portions 22, 26, 32, 36 and thereby hoist the working platform 4 upwards to the stowed position.

At stage 306 the stopper mechanism 12 is engaged to prevent movement of the tension members 8*a*, 8*b* and thereby hold the working platform 4 at the stowed position. As described above, this stage may alternatively (or additionally) comprise engaging other lock designed to secure the working platform 4 at the stowed position (e.g. a latching mechanism). Using the stopper mechanism to both hold the working platform in the stowed position and in the operational position (before the support members are moved to the supporting position) is advantageous since only a single mechanism is required to achieve both of these functionalities, in addition to the safety provided by the stopper mechanism preventing uncontrolled free-fall of the working platform between the stowed position and the operational position.

Finally, at stage 308, the user closes the decorative ceiling cover 16 so as to cover the working platform 4 (and the support frame 14). This may be by hinging the decorative ceiling cover into place. A latch may be provided to secure the decorative ceiling cover 16 in the closed position.

It will be appreciated by those skilled in the art that the disclosure has been illustrated by describing one or more specific aspects thereof, but is not limited to these aspects;

many variations and modifications are possible, within the scope of the accompanying claims.

The invention claimed is:

1. An elevator car defining an interior space for accommodating passengers and/or cargo, the elevator car comprising:

a working platform having an upper surface facing a ceiling of the elevator car and a lower surface facing a floor of the elevator car;

a tension member, wherein the working platform is moveable between a stowed position, above the interior space, and an operational position, within the interior space, using the tension member;

a mounting frame arranged on the lower surface of the working platform;

a support frame arranged above an interior space of the elevator car, wherein the tension member comprises a first tension member, and including a second tension member wherein the first and second tension members extend between the support frame and the working platform, and including a plurality of deflection sheaves comprising at least a first deflection sheave, a second deflection sheave, and a third deflection sheave associated with each of the first tension member and the second tension member, and wherein each of the first tension member and the second tension member comprises at least:

a first portion that extends downwards from the support frame to the first deflection sheave which is attached to the working platform;

a second portion that extends along a length of the working platform to the second deflection sheave which is attached to the working platform; and a third portion that extends upwards to the third deflection sheave which is fixed to the support frame; and a support member, arranged, when in a supporting position, to support the working platform, from below, when the working platform is in the operational position, and wherein the support member is accommodated within the mounting frame underneath the working platform when the support member is in a stowed position.

2. The elevator car of claim 1, further comprising a support frame arranged above an interior space of the elevator car, wherein the tension member attaches to the support frame and the working platform via a plurality of deflection sheaves that include at least a first deflection sheave and a second deflection sheave, and wherein the tension member is arranged to pass over the first deflection sheave which is associated with the working platform and the second deflection sheave which is associated with the support frame of the elevator car.

3. The elevator car of claim 2, wherein the first deflection sheave is mounted to an edge of the working platform.

4. The elevator car of claim 2, wherein the first deflection sheave is pivotably mounted to the working platform.

5. The elevator car of claim 1, wherein the support member comprises a first support member, and including a second support member accommodated within the mounting frame when the second support member is in a stowed position, and wherein the first support member supports one end of the working platform and the second support member supports an opposite end of the working platform when the working platform is in the operational position.

6. The elevator car of claim 1, wherein the support member is movable between a stowed position, and the supporting position, wherein in the supporting position the support member extends away from the working platform, to support the working platform from below.

7. The elevator car of claim 1, wherein the support member comprises one or more steps.

8. The elevator car of claim 1, wherein the interior space has an interior space depth and wherein the working platform has a working platform depth, wherein the working platform depth is less than 300 mm smaller than the interior space depth.

9. The elevator car of claim 8, wherein the working platform depth is at least 200 mm smaller than the interior space depth.

10. The elevator car of claim 1, including a support frame arranged above an interior space of the elevator car, and wherein the tension member passes over at least one deflection sheave associated with the working platform, and passes over at least one other deflection sheave associated with the support frame to engage with a stopper mechanism that is associated with the support frame.

11. An elevator car defining an interior space for accommodating passengers and/or cargo, the elevator car comprising:

a working platform;

a tension member, wherein the working platform is moveable between a stowed position, above the interior space, and an operational position, within the interior space, using the tension member;

a support member, arranged, when in a supporting position, to support the working platform, from below, when the working platform is in the operational position; and a stopper mechanism having an open configuration, in which the stopper mechanism allows movement of the tension member such as to allow movement of the working platform between the stowed position and the operational position, and a closed configuration, in which the stopper mechanism prevents movement of the tension member such as to prevent movement of the working platform between the stowed position and the operational position.

12. The elevator car as claimed in claim 11, wherein the stopper mechanism is biased into the closed configuration.

13. The elevator car as claimed in claim 12, wherein the stopper mechanism is biased into the closed configuration by a weight of the working platform applying a reaction force to the stopper mechanism.

14. The elevator car of any of claim 11, wherein the stopper mechanism is located at an upper part of the elevator car.

15. The elevator car of any of claim 11, wherein the tension member comprises a first tension member, and wherein the elevator car comprises a second tension member, and wherein in the open configuration the stopper mechanism allows movement of both the first tension member and the second tension member such as to allow movement of the working platform between the stowed position and the operational position, and in the closed configuration the stopper mechanism prevents movement of both the first tension member and the second tension member such as to prevent movement of the working platform between the stowed position and the operational position.

16. A method of moving a working platform of an elevator car between a stowed position above an interior space defined by the elevator car, for accommodating passengers and/or cargo, and a position within the interior space in which the working platform is usable by a maintenance person, the method comprising:

moving the working platform between the stowed position and an operational position, within the interior space, using a tension member, wherein movement is in response to releasing a stopper mechanism associated with the tension member moving the stopper mechanism between a closed configuration and an open configuration to control movement of the working platform, wherein:

when the stopper mechanism is in the closed configuration, movement of the working platform via the tension member is prevented, and when the stopper mechanism is in the open configuration, movement of the working platform via the tension member is allowed; and moving a support member between a stowed position and a supporting position, wherein the support member is arranged to support the working platform from below when the support member is in the supporting position and the working platform is in the operational position.

17. The method of claim 16, including:

providing the working platform with an upper surface facing a ceiling of the elevator car and a lower surface facing a floor of the elevator car;

arranging a mounting frame on the lower surface of the working platform; and accommodating the support member within the mounting frame underneath the working platform when the support member is in a stowed position.

18. The method of claim 16, including:

providing a support frame arranged above an interior space of the elevator car;

passing the tension member over at least one deflection sheave associated with the working platform; and passing the tension member over at least one other deflection sheave associated with the support frame to engage with the stopper mechanism.

* * * * *